(12) United States Patent
Hansen

(10) Patent No.: US 9,391,365 B2
(45) Date of Patent: Jul. 12, 2016

(54) MAXIMUM LIKELIHOOD ANGLE ESTIMATION OF WIDEBAND SIGNALS USING PHASED ARRAY ANTENNAS

(71) Applicant: RAYTHEON COMPANY, Waltham, MA (US)

(72) Inventor: Charles T. Hansen, Palos Verdes Estates, CA (US)

(73) Assignee: RAYTHEON COMPANY, Waltham, MA (US)

( * ) Notice: Subject to any disclaimer, the term of this patent is extended or adjusted under 35 U.S.C. 154(b) by 675 days.

(21) Appl. No.: 13/889,144

(22) Filed: May 7, 2013

(65) Prior Publication Data

US 2014/0132451 A1    May 15, 2014

Related U.S. Application Data

(63) Continuation of application No. 13/092,073, filed on Apr. 21, 2011, now Pat. No. 8,451,173.

(51) Int. Cl.
*G01S 5/02*    (2010.01)
*H01Q 3/00*    (2006.01)
(Continued)

(52) U.S. Cl.
CPC .. *H01Q 3/00* (2013.01); *G01S 3/32* (2013.01); *G01S 3/46* (2013.01); *G01S 7/295* (2013.01); *G01S 13/02* (2013.01); *G01S 13/0209* (2013.01); *G01S 13/42* (2013.01); *G01S 13/4454* (2013.01)

(58) Field of Classification Search
CPC ............... H01Q 3/00; G01S 3/32; G01S 3/46; G01S 37/295; G01S 13/02; G01S 13/0209; G01S 13/42; G01S 13/4454

USPC ........................................................ 342/422
See application file for complete search history.

(56) References Cited

U.S. PATENT DOCUMENTS 2,608,683 A    8/1952    Blewett
2,981,948 A    4/1961    Kurtz
(Continued)

FOREIGN PATENT DOCUMENTS

EP    1 087 545 A1    3/2001

OTHER PUBLICATIONS

Nickel, "Overview of Generalized Monopulse Estimation", IEEE Aerospace and Electronic Systems Magazine, IEEE Service Center Piscataway, NJ,US, vol. 20, No. 6, Jun. 1, 2006 (pp. 27-56).
(Continued)

*Primary Examiner* — Frank J McGue
(74) *Attorney, Agent, or Firm* — Lewis Roca Rothgerber Christie LLP

(57) ABSTRACT

A method for estimating a target direction of a wideband signal received on an electronically steered array includes: applying convolutional or stretch processing to spatial frequency data of the wideband signal; initializing a stabilization direction to a beam pointing direction; stabilizing the spatial frequency data to the stabilization direction; compressing the spatial frequency data to a plurality of frequency range or time bins; selecting range or time bins and forming a covariance matrix; calculating an estimated target direction using the covariance matrix; determining if a stabilization direction accuracy condition is met; recalculating the stabilization direction based on the estimated target direction if the stabilization direction accuracy condition is not met; and iteratively repeating until the stabilization direction accuracy condition is met.

11 Claims, 8 Drawing Sheets

(51) Int. Cl.
*G01S 3/32* (2006.01)
*G01S 3/46* (2006.01)
*G01S 7/295* (2006.01)
*G01S 13/02* (2006.01)
*G01S 13/42* (2006.01)
*G01S 13/44* (2006.01)

(56) References Cited

U.S. PATENT DOCUMENTS

| | | |
|---|---|---|
| 3,713,155 A | 1/1973 | Jaffe |
| 5,223,850 A | 6/1993 | Branigan et al. |
| 5,592,178 A | 1/1997 | Chang et al. |
| 5,945,940 A | 8/1999 | Cuomo |
| 6,624,783 B1 * | 9/2003 | Rabideau ............... G01S 7/292 342/128 |
| 6,653,973 B2 * | 11/2003 | Yu ............................. G01S 3/74 342/154 |
| 7,190,305 B2 | 3/2007 | Isaji |
| 8,451,173 B2 * | 5/2013 | Hansen .................... G01S 3/32 342/422 |

OTHER PUBLICATIONS

Extended European Search Report for European Application No. 12155386.1, Filed Feb. 14, 2012, Extended European Search Report dated Dec. 5, 2012 and mailed Dec. 13, 2012 (8 pgs.).

* cited by examiner

MAXIMUM LIKELIHOOD ANGLE ESTIMATION OF WIDEBAND SIGNALS USING PHASED ARRAY ANTENNAS

CROSS-REFERENCE TO RELATED APPLICATIONS

This application is a continuation of U.S. patent application Ser. No. 13/092,073, titled "Maximum Likelihood Angle Estimation of Wide Band Signals Using Phased Array Antennas," filed in the United States Patent and Trademark Office on Apr. 21, 2011, issued as U.S. Pat. No. 8,451,173 on May 28, 2013, the entire content of which is incorporated herein by reference.

STATEMENT REGARDING FEDERALLY SPONSORED RESEARCH OR DEVELOPMENT

This invention disclosure is related to Government contract FA8650-08-D-1446 awarded by the Department of the Air Force. The Government has certain rights in this invention.

BACKGROUND

Maximum likelihood angle estimation is a technique which may be used in the context of radar for determining an angle of arrival of a signal in a radar or other radio frequency electromagnetic sensor.

Generally, the algorithm that performs the angle estimation using maximum likelihood estimation relies on the assumption that the estimated target angle does not substantially vary as a function of the frequencies that make up the signal. However, this assumption does not hold true for wideband or spread spectrum waveforms or signals when they are measured by an electronically scanned phased array antenna.

SUMMARY

Embodiments of the present invention are directed to systems and methods which use maximum likelihood analysis to estimate a target angle, the systems and methods being substantially frequency invariant even when used with phase steered antennas and wideband waveforms.

According to one embodiment of the present invention, a method for estimating a target direction of a wideband signal received on an electronically steered array includes: applying convolutional or stretch processing to spatial frequency data of the wideband signal; initializing a stabilization direction to a beam pointing direction; stabilizing the spatial frequency data to the stabilization direction; compressing the spatial frequency data to a plurality of frequency range or time bins; selecting range or time bins and forming a covariance matrix; calculating an estimated target direction using the covariance matrix; determining if a stabilization direction accuracy condition is met; recalculating the stabilization direction based on the estimated target direction if the stabilization direction accuracy condition is not met; and iteratively repeating stabilizing the spatial frequency data to the stabilization direction, compressing the spatial frequency data to a plurality of frequency range or time bins, calculating an estimated target direction using the covariance matrix, and recalculating the stabilization direction based on the estimated target direction until the stabilization direction accuracy condition is met.

According to another embodiment of the present invention, a system for stabilizing wideband spatial frequency data of a wideband signal for estimating a target direction on an electronically steered antenna array includes: a beam stabilizer configured to stabilize the spatial frequency data in a stabilization direction; a steering angle calculator configured to estimate the target direction using the stabilized spatial frequency data; a stabilization angle accuracy threshold calculator for determining whether a stabilization direction accuracy condition is met; and a stabilization angle updater for updating the stabilization direction to the estimated target direction, wherein the steering angle calculator is configured to initialize the stabilization direction to a beam pointing direction and to iteratively update the stabilization angle and to recalculate the estimated target direction until the stabilization accuracy condition is met.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
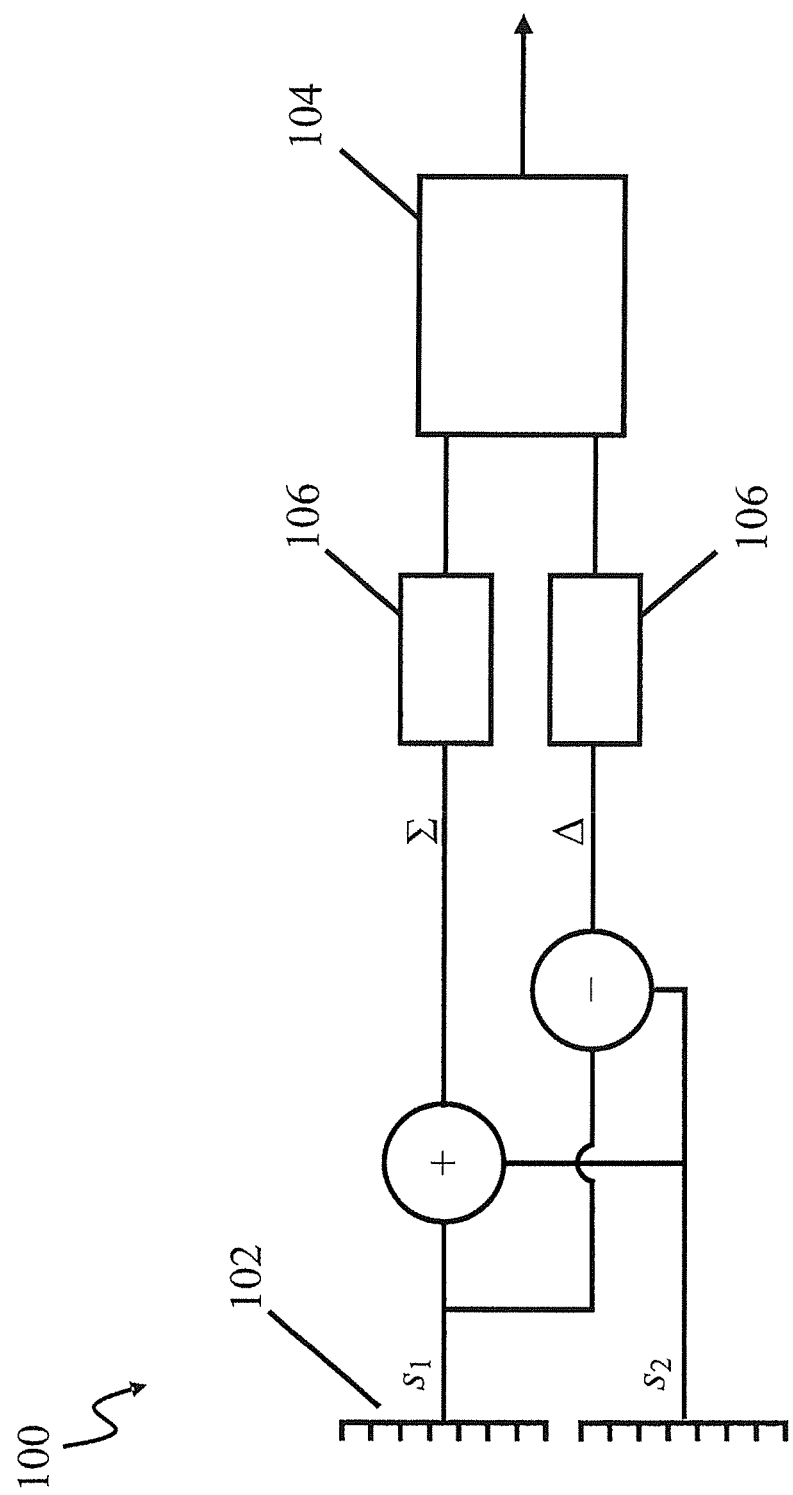
FIG. 1 is a block diagram of a radar system according to one embodiment of the present invention.

According to one embodiment of the present invention, maximum likelihood angle estimation may be used in a radar system 100 such as one shown in block diagram form in FIG. 1. An antenna 102 receives a signal which is divided into two components ($s_1$ and $s_2$) split into sum and difference channels ($\Sigma$ and $\Delta$) and supplied to analog-to-digital converters 106. A signal processor 104 may be used to analyze the received signals. The system 100 may also include filters, oscillators, and other analog and digital signal processing components as are well known in the art.

Figure 2:
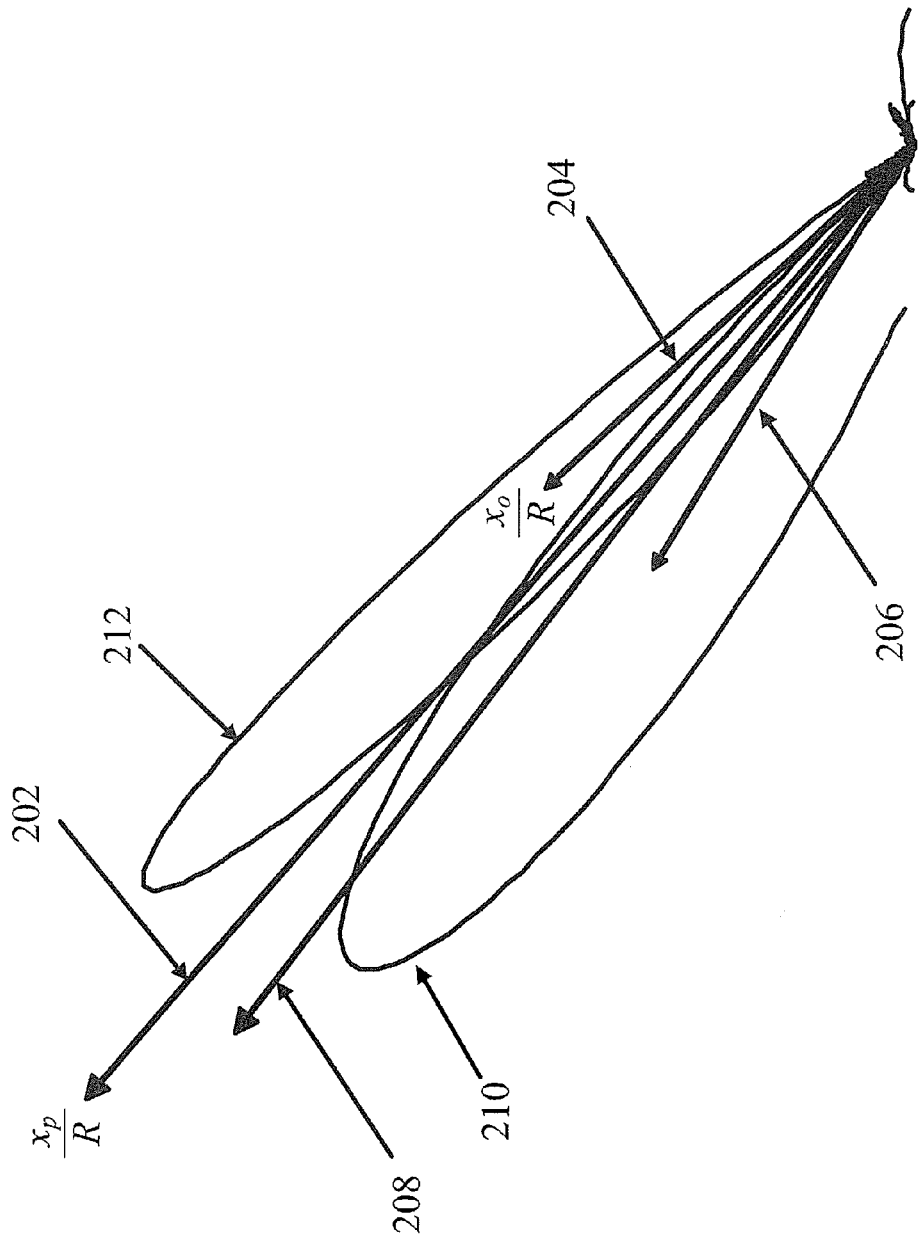
FIG. 2 is a diagram illustrating various directions or angles associated with the system, including a nominal beam pointing direction, a target direction, and a stabilization direction, overlaid on target angles calculated using an unstabilized beam.

Angle estimation of radar returns is often performed with an antenna having two channels: a sum channel and a difference channel. The angle of arrival of a received signal (or, equivalently, due to antenna reciprocity theorem, the transmission angle of an outgoing signal) is computed using the sum and difference channels, but the relationship between the angle of arrival and the relative amplitude of the received signal depends on the frequency of the signal when the antenna is steered by adjusting the phase between the elements. As a result, these angle estimation techniques are generally used with narrowband signals rather than wideband signals because there is not a well defined mapping between angle and relative amplitude of the signal for wideband signals. That is, the wideband signals have a range of frequencies, making it difficult to calculate a single angle of arrival for all of the frequencies. For example, as shown in FIG. 2, different target angles 210 and 212 may be calculated based at opposing ends of the wideband signal. Therefore, a substantially frequency independent method of determining the angle of arrival would be useful.

One such system and method is described in "Beam Stabilization for Wideband Phase Comparison Monopulse Angle Estimation with Electronically Steered Antennas," U.S. patent application Ser. No. 12/925,668 filed on Oct. 26, 2010, the entire disclosure of which is incorporated herein by reference.

Aspects of a maximum likelihood method and system according to embodiments of the present invention are directed to substantially reducing or eliminating deterministic high order angle estimation error caused by beam stabilization in frequency and providing a way to combine multiple observations (e.g., in the case of a radar signal, multiple range or time bins) into a single angle estimate, which can provide an effective reduction of random errors by an improvement in signal to noise ratio.

Stabilization of the beam in frequency space so that frequency elements of the beam point in a consistent direction is used in order to apply the angle estimation technique to wideband signals. Beam stabilization is discussed in more depth in the above referenced patent application. To summarize, the matrix elements for beam stabilization as a function of frequency are given by:

$$m_{\Delta\Sigma} = \frac{-s'_\Delta D}{s'_\Sigma \partial s'_\Delta - s'_\Delta \partial s'_\Sigma}$$

$$m_{\Delta\Delta} = \frac{D - m_{\Delta\Sigma}\partial s'_\Sigma}{\partial s'_\Delta}$$

$$m_{\Sigma\Delta} = \frac{-\partial s'_\Sigma S}{s'_\Sigma \partial s'_\Delta - s'_\Delta \partial s'_\Sigma}$$

$$m_{\Sigma\Sigma} = \frac{S - m_{\Sigma\Delta}s'_\Delta}{s'_\Sigma}$$

Assuming we are only solving for on angle of arrival, in the above expressions:

$$S = s'_{\Sigma x}(x_o, k_o)$$

and $$D = \partial s'_{\Sigma x}(x_o, k_o)$$

where we have defined:

$$s'_\Sigma = s'_{\Sigma x}(x_o, k) = \sum_n w_{\Sigma n} \exp\left[i\left(\frac{x_o}{R}d_{xn}\right)(k - k_o)\right]$$

$$\partial s'_\Sigma = \frac{\partial s'_{\Sigma x}}{\partial x}(x_o, k) = \sum_n w_{\Sigma xn}\frac{d_{xn}k}{R}\exp\left[i\left(\frac{x_o}{R}d_{xn}\right)(k - k_o)\right]$$

and $$s'_\Delta = s'_{\Delta x}(x_o, k) = \sum_n w_{\Delta xn}\exp\left[i\left(\frac{x_o}{R}d_{xn}\right)(k - k_o)\right]$$

$$\partial s'_\Delta = \frac{\partial s'_{\Delta x}}{\partial x}(x_o, k) = \sum_n w_{\Delta xn}\frac{d_{xn}k}{R}\exp\left[i\left(\frac{x_o}{R}d_{xn}\right)(k - k_o)\right]$$

where when two signals ($s_1$ and $s_2$) are received on corresponding halves of an antenna, $s'_\Sigma$ is a sum channel and $s'_\Delta$ is a difference channel (e.g., $s'_\Sigma = s_1 + s_2$ and $$s'_\Delta = s_1 - s_2), k = \frac{\omega}{c}$$

is the spatial frequency, $d_{xn}$ are the element locations, $$\frac{x_o}{R}$$

is the desired pointing direction cosine, $$k_o = \frac{\omega_o}{c}$$

is the nominal spatial frequency corresponding to the radio frequency carrier, and $w_{\Sigma,\Delta xn}$ are the stabilized amplitudes of the radiating elements that form the phased array antenna. $w_{\Sigma,\Delta xn}$ can be found from:

$$w_{\Sigma,\Delta xn} = \sum_n w'_{\Sigma,\Delta xn}\exp\left[i\left(\frac{x_o}{R} - \frac{x_p}{R}\right)d_{xn}k_o\right]$$

where $w'_{\Sigma,\Delta xn}$ are the unsteered amplitudes of the radiating elements that form the phased array antenna and $$\frac{x_p}{R}$$

is the direction cosine defined by the steering phases commanded by the antenna steering hardware. Note that the beam is not necessarily stabilized to the pointing direction commanded by the hardware. Therefore, in general, $x_o \neq x_p$.

A derivation of the above equations appears in "Beam Stabilization for Wideband Phase Comparison Monopulse Angle Estimation with Electronically Steered Antennas," which was incorporated by reference, above.

Note that there are a few different relevant angles (or "directions") involved in this system, as illustrated in FIG. 2:

The "antenna pointing direction"

$$202\left(\frac{x_p}{R}\right)$$

refers to the direction in which the antenna is electronically steered by altering the phases of the signals applied to the antenna.

The "stabilization direction"

$$204\left(\frac{x_o}{R}\right)$$

refers to the direction in which the beam is stabilized to be substantially frequency independent through the computation of and application of the above-described stabilization coefficients (e.g., $m_{\Delta\Sigma}$, $m_{\Delta\Delta}$, $m_{\Sigma\Delta}$, and $m_{\Sigma\Sigma}$) to the unstabilized data. The stabilization direction is not restricted to the antenna pointing direction and in one embodiment is adjusted to optimize angle estimation.

The "steering direction" 206 ($\theta_n$) refers to the direction which is used to calculate the likelihood function for the purpose of angle estimation.

The "target direction" 208 refers to the true direction to the target, which the system and method attempt to estimate.

The maximum likelihood angle estimation technique applies probability theory to determine the most probable angle of arrival of the signal. In particular, the most probable angle of arrival of the signal occurs at the maximum of the following likelihood function (which is related to the logarithm of the probability distribution function):

$$J(\theta) = \sum_n \frac{|s^\dagger(\theta)Q^{-1}y_n|^2}{s^\dagger(\theta)Q^{-1}s(\theta)}$$

where $y_n$ is the set of stabilized data vectors from the antennas, which includes $s_\Sigma$ and $s_\Delta$, $s(\theta)$ is the steering vector corresponding to an angle $\theta$ ("steering direction" as defined above), and Q is the covariance matrix of any undesired signals present, such as noise, interference, or clutter.

The steering vector $s(\theta)$ can be written:

$$s(\theta) = \begin{pmatrix} \sum_n w'_{\Sigma xn} \exp\left[i\left(\theta - \frac{x_o}{R}\right)d_{xn}k_o\right] \\ \sum_n w'_{\Delta xn} \exp\left[i\left(\theta - \frac{x_o}{R}\right)d_{xn}k_o\right] \end{pmatrix}$$

where, in this case, $\theta$ is the likelihood steering direction cosine. Recall that $$\frac{x_o}{R}$$

is the direction cosine to which the beam is stabilized.

The likelihood function can be rewritten:

$$J(\theta) = \sum_n \frac{s^\dagger(\theta)Q^{-1}y_n y_n^\dagger Q^{-1}s(\theta)}{s^\dagger(\theta)Q^{-1}s(\theta)}$$

where we have used the fact that Q is Hermetian. Because only $y_n$ depends on n, the summation can be brought inside the product:

$$J(\theta) = \frac{s^\dagger(\theta)Q^{-1}\left(\sum_n y_n y_n^\dagger\right)Q^{-1}s(\theta)}{s^\dagger(\theta)Q^{-1}s(\theta)}$$

Therefore, the covariance matrix of the desired signals is:

$$\left(\sum_n y_n y_n^\dagger\right) \equiv C_y$$

Therefore, the likelihood function when multiple observations or range or time bins are present depends only on the covariance matrix of the data in question.

The maximum of the likelihood function can be found by finding the zero of its derivative. This may be found using a Newton-Raphson technique. The derivative of the likelihood function is:

$$J'(\theta) = \sum_n \frac{2s^\dagger(\theta)Q^{-1}s(\theta)s^\dagger(\theta)Q^{-1}y_n y_n^\dagger Q^{-1}\frac{\partial s(\theta)}{\partial \theta} - 2s^\dagger(\theta)Q^{-1}y_n y_n^\dagger Q^{-1}s(\theta)s^\dagger(\theta)Q^{-1}\frac{\partial s(\theta)}{\partial \theta}}{(s^\dagger(\theta)Q^{-1}s(\theta))^2}$$

which is zero when the numerator is zero. Therefore. we would like to find the zero of:

$$f(\theta) = \sum_n s^\dagger(\theta)Q^{-1}s(\theta)s^\dagger(\theta)Q^{-1}y_n y_n^\dagger Q^{-1}\frac{\partial s(\theta)}{\partial \theta} - s^\dagger(\theta)Q^{-1}y_n y_n^\dagger Q^{-1}s(\theta)s^\dagger(\theta)Q^{-1}\frac{\partial s(\theta)}{\partial \theta}$$

Near its zero, this function can be approximated to first order by $$f(\theta) \approx f(\theta_n) + f'(\theta_n)(\theta - \theta_n)$$

where:

$$f'(\theta) = \frac{\partial s^\dagger(\theta)}{\partial \theta}Q^{-1}s(\theta)s^\dagger(\theta)Q^{-1}C_y Q^{-1}\frac{\partial s(\theta)}{\partial \theta} + $$
$$s^\dagger(\theta)Q^{-1}\frac{\partial s(\theta)}{\partial \theta}s^\dagger(\theta)Q^{-1}C_y Q^{-1}\frac{\partial s(\theta)}{\partial \theta} + $$
$$s^\dagger(\theta)Q^{-1}s(\theta)\frac{\partial s^\dagger(\theta)}{\partial \theta}Q^{-1}C_y Q^{-1}\frac{\partial s(\theta)}{\partial \theta} + $$
$$s^\dagger(\theta)Q^{-1}s(\theta)s^\dagger(\theta)Q^{-1}C_y Q^{-1}\frac{\partial^2 s(\theta)}{\partial \theta^2} - $$
$$\frac{\partial s^\dagger(\theta)}{\partial \theta}Q^{-1}C_y Q^{-1}s(\theta)s^\dagger(\theta)Q^{-1}\frac{\partial s(\theta)}{\partial \theta} - $$
$$s^\dagger(\theta)Q^{-1}C_y Q^{-1}\frac{\partial s(\theta)}{\partial \theta}s^\dagger(\theta)Q^{-1}\frac{\partial s(\theta)}{\partial \theta} - $$
$$s^\dagger(\theta)Q^{-1}C_y Q^{-1}s(\theta)\frac{\partial s^\dagger(\theta)}{\partial \theta}Q^{-1}\frac{\partial s(\theta)}{\partial \theta} - $$
$$s^\dagger(\theta)Q^{-1}C_y Q^{-1}s(\theta)s^\dagger(\theta)Q^{-1}\frac{\partial^s(\theta)}{\partial \theta^2}$$

Therefore, the Newton-Raphson iterative procedure is:

$$\theta_{n+1} = \theta_n - \frac{f(\theta_n)}{f'(\theta_n)}$$

That is, the Newton-Raphson iterative procedure is used to produce successive values of $\theta_n$ until the calculated angle of arrival correction $$\Delta\theta_n = -\frac{f(\theta_n)}{f'(\theta_n)}$$

(or improvement) is less than a threshold $\Delta\theta_{n,th}$, at which point an estimated target angle $\theta_N$ is output.

However, the results calculated from this procedure will retain some error due to the beam stabilization transformation. To reduce or eliminate this error, the direction of beam stabilization can be adjusted to the newly determined steering angle and the Newton-Raphson iterative procedure can be repeated using the re-stabilized data to calculate a steering angle that is a more accurate estimate of the actual angle of arrival of the signal. This process of iteratively adjusting the stabilization direction can be repeated until a stabilization direction accuracy condition has been met (e.g., the difference between successively calculated estimated target angles $\theta_N$ is less than $\Delta\theta_{N,th}$), at which point the final estimated target angle is output.

Figure 3A:
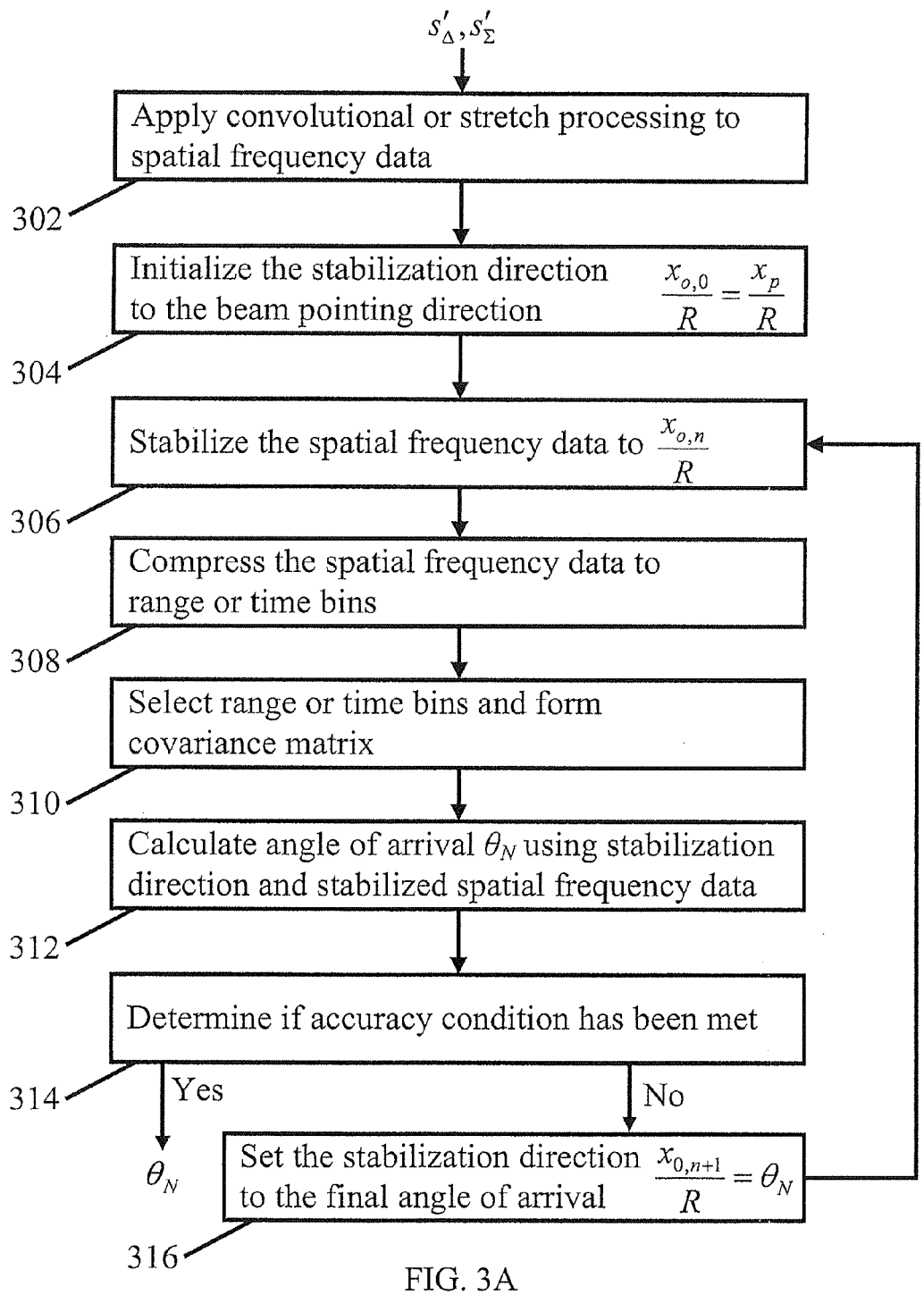
FIG. 3A is a flowchart illustrating a method of determining an angle to a target from unstabilized spatial frequency data according to one embodiment of the present invention.

According to one embodiment of the present invention, a method for implementing the above technique can be performed as follows and as illustrated in FIG. 3A. A system according to one embodiment of the present invention that may be configured to implement the algorithm of FIG. 3A is shown in FIGS. 4B, 5B, and 6B.

Figure 3B:
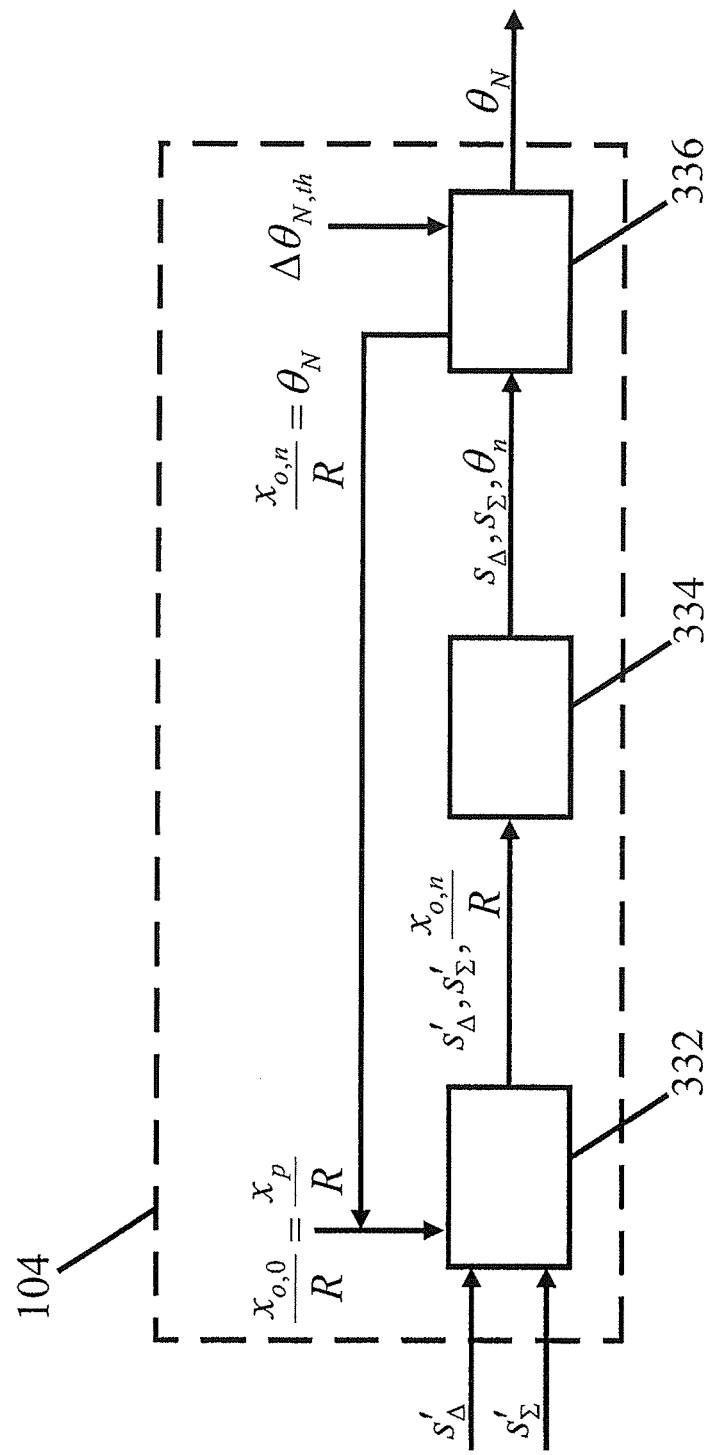
FIG. 3B is a block diagram illustrating a signal processor for determining a target angle from unstabilized spatial frequency data according to one embodiment of the present invention.

FIG. 3A is a flowchart illustrating one method of determining an angle to a target from unstabilized spatial frequency data which is formed after initial range processing of the raw data received from an antenna. FIG. 3B is a block diagram illustrating a portion of a signal processor 104 for determining the target angle from the spatial frequency data. The signal received from the antenna undergoes transformation into spatial frequency data (e.g., through the first stage of convolutional or stretch processing) (302) at a beam stabilizer 332.

Initially, the direction in which the beam is stabilized $$\left(\frac{x_o}{R}\right)$$

is set to (or initialized to) the nominal pointing direction of the antenna array $$\left(\frac{x_p}{R}\right),$$

which is the pointing direction associated with the center frequency of the waveform (304). In other words, $$\frac{x_{o,0}}{R} = \frac{x_p}{R},$$

where $$\frac{x_{o,n}}{R}$$

refers to the beam stabilization direction during the nth iteration of the loop. However, the stabilization direction is generally different from the antenna pointing direction.

The unstabilized spatial frequency data $s'_\Delta$ and $s'_\Sigma$ is stabilized in the beam stabilization direction $$\frac{x_{o,n}}{R} \quad (306)$$

to produce spatial frequency data $s_\Delta$ and $s_\Sigma$, after which it is compressed into range or time bins (308) by the beam stabilizer 332. Range or time bins are selected and a covariance matrix is also computed (310) by the beam stabilizer 332. The stabilized spatial frequency data $s_\Delta$ and $s_\Sigma$ is then supplied with the beam stabilization direction to the steering angle calculator 334.

The steering angle calculator 334 calculates an angle of arrival $\theta_N$ using the stabilization direction and the stabilized spatial frequency data (312). As noted above, this calculation results in deterministic error due to the beam stabilization transformation. In order to reduce or eliminate this error, a stabilization direction threshold accuracy calculator 336 compares the newly calculated estimated angle of arrival $\theta_N$ with the previous estimated angle of arrival (e.g., $\theta_{N-1}$) to determine if a stabilization direction accuracy condition has been met (e.g., the difference between two successive estimated angles of arrival is less than a threshold value $\Delta\theta_{N,th}$) (314). If the stabilization direction accuracy condition is not satisfied, then the stabilization direction is set to the newly calculated estimated angle of arrival (316) and the process is repeated, beginning with the restabilization of the beam in the new stabilization direction (312) by supplying the new stabilization direction to the beam stabilizer 332. When the stabilization direction accuracy condition is satisfied, the newly computed estimated angle of arrival $\theta_N$ is output as the angle to the target. When working with multiple targets, a separate data covariance matrix is determined for each target. For example, if two targets are separated in range, two different groups of range or time bins would be used to form two different covariance matrices.

Figure 4A:
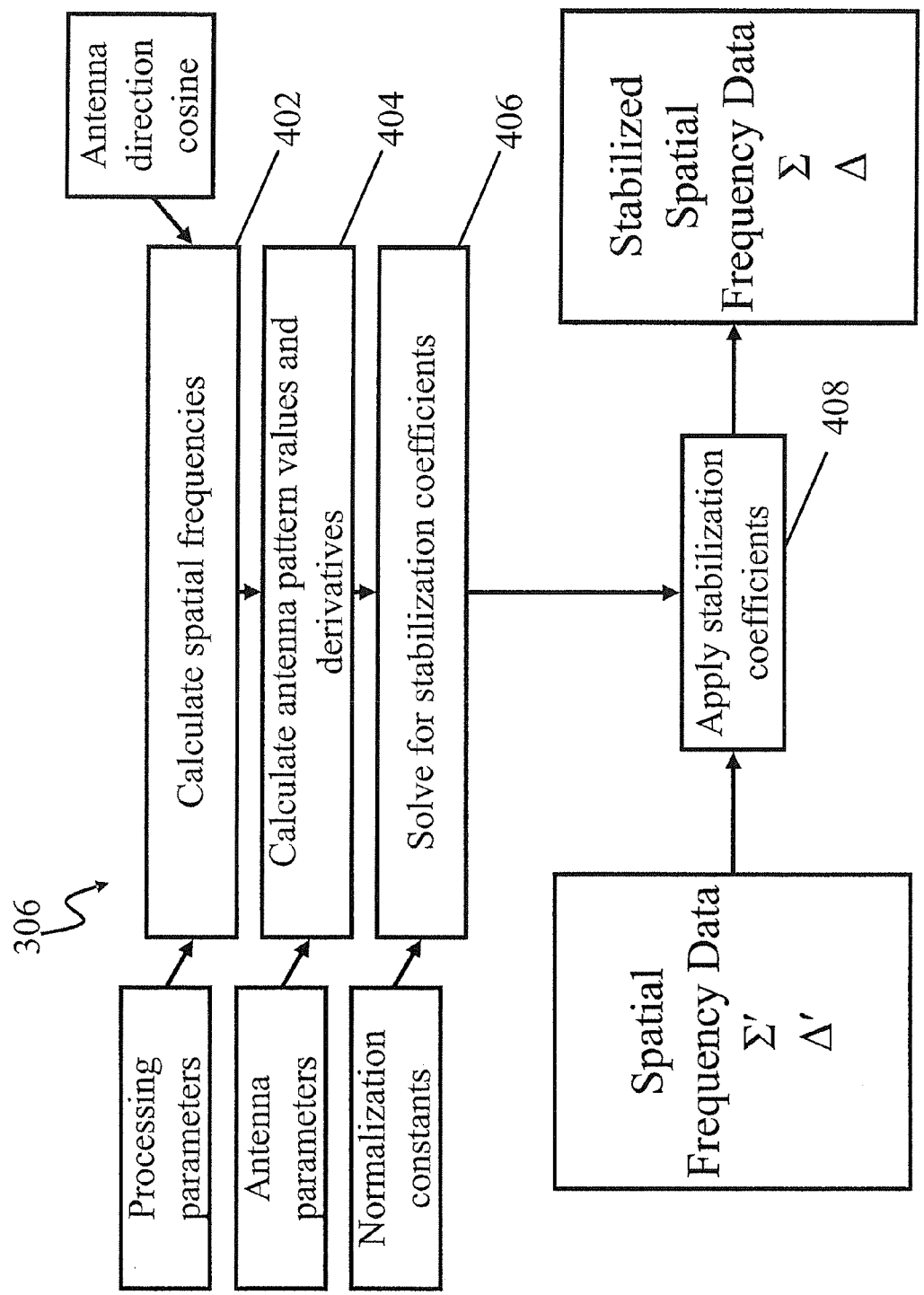
FIG. 4A is a flowchart illustrating a method of stabilizing spatial frequency data according to one embodiment of the present invention.
Figure 4B:
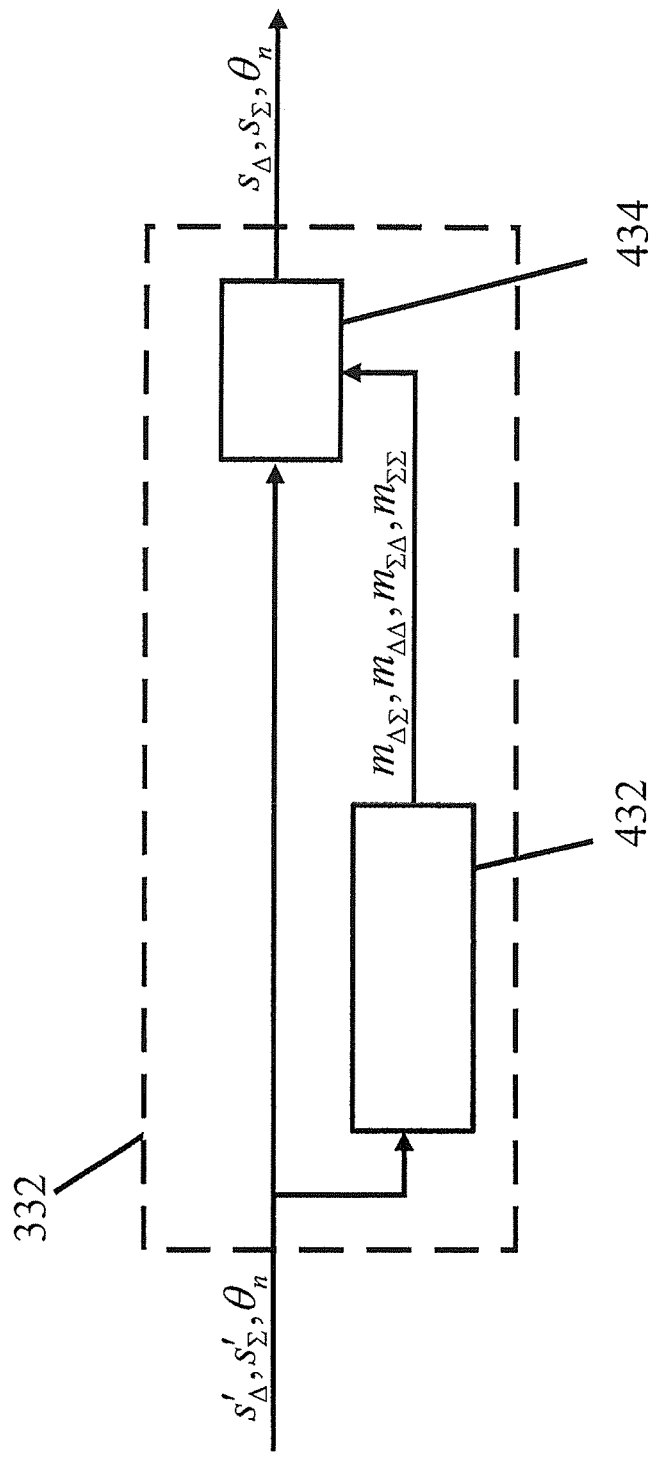
FIG. 4B is a block diagram illustrating a signal stabilizer according to one embodiment of the present invention.

FIG. 4A is a flowchart illustrating, in additional detail, one method of stabilizing the spatial frequency data to the beam steering direction. FIG. 4B is a block diagram illustrating a beam stabilizer 332 according to one embodiment of the present invention. The spatial frequencies (e.g., $s'_\Delta$ and $s'_\Sigma$) are calculated from the spatial frequency data (402) using processing parameters of the signal waveforms (e.g., the characteristics of the transmitted pulse) and the antenna direction. Using antenna parameters (e.g., the number and spacing of antenna elements), antenna pattern values (e.g., element amplitudes or weights of the antenna elements) and derivatives of the spatial frequencies are also calculated (404). Normalization constants are used to solve for stabilization coefficients (e.g., $m_{\Delta\Sigma}$, $m_{\Delta\Delta}$, $m_{\Sigma\Delta}$, and $m_{\Sigma\Sigma}$, as described above) (406) by a stabilization coefficient calculator 432. The stabilization coefficients (which may be expressed as a combination matrix) are applied to the spatial frequency data (e.g., $s'_\Delta$ and $s'_\Sigma$) by a combiner (or matrix multiplier) 434 to obtain the stabilized spatial frequency data stabilized in the stabilization direction (e.g., $s_\Delta=m_{\Delta\Delta}s'_\Delta+m_{\Delta\Sigma}s'_\Sigma$ and $s_\Sigma=m_{\Sigma\Delta}s'_\Delta+m_{\Sigma\Sigma}s'_\Sigma$) (408).

Figure 5A:
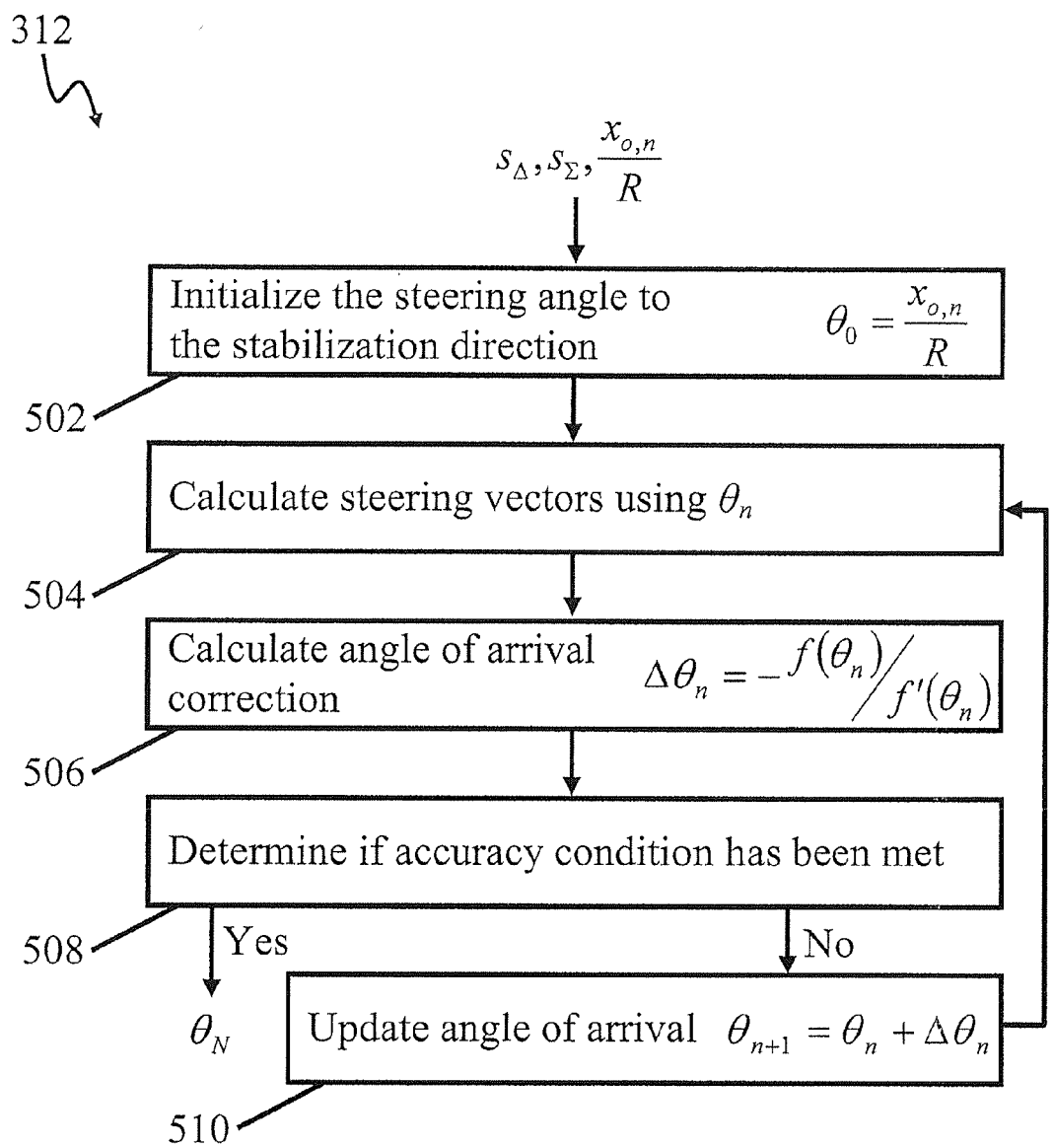
FIG. 5A is a flowchart illustrating a method of calculating a steering angle according to one embodiment of the present invention.
Figure 5B:
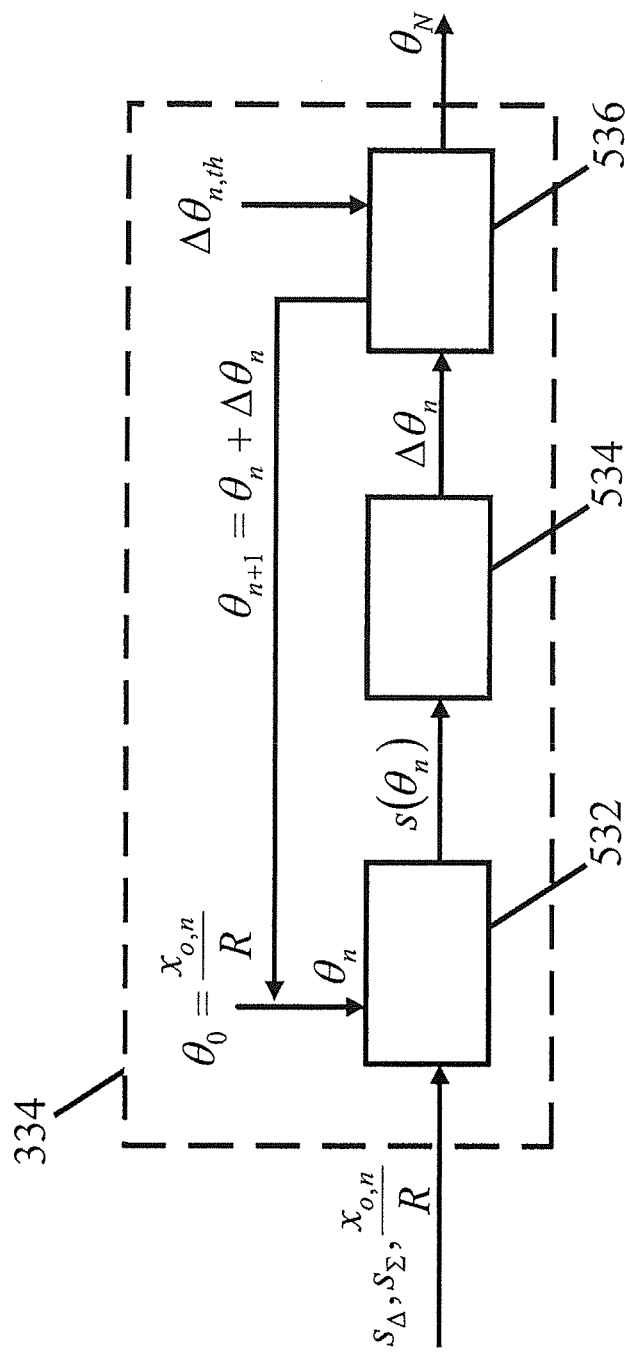
FIG. 5B is a block diagram illustrating a steering angle calculator according to one embodiment of the present invention.

FIG. 5A is a flowchart illustrating a method of calculating a steering angle according to one embodiment of the present invention. FIG. 5B is a block diagram illustrating a steering angle calculator 334 according to one embodiment of the present invention which uses the Newton-Raphson method described above to estimate the angle of arrival.

The steering angle calculator 334 includes a steering vector calculator 532 which initializes the steering vectors $\theta_n$ to the stabilization direction $$\frac{x_{o,n}}{R} \left(\text{e.g., } \theta_0 = \frac{x_{o,n}}{R}\right) (502)$$

and calculates steering vectors using the stabilized spatial frequency data $s_\Delta$ and $s_\Sigma$ (504). An angle correction calculator 534 then uses the steering vectors $s(\theta_n)$ to calculate an angle of arrival correction $\Delta\theta_n$ (506), where, as derived above:

$$\Delta\theta_n = -\frac{f(\theta_n)}{f'(\theta_n)}$$

An angle of arrival accuracy calculator 536 compares the angle of arrival correction $\Delta\theta_n$ with an angle of arrival accuracy condition $\Delta\theta_{n,th}$ (508). If the angle of arrival accuracy condition is not satisfied (e.g., $\Delta\theta_n > \Delta\theta_{n,th}$), a new estimate of the angle of arrival $\theta_{n+1}$ is computed by applying the Newton-Raphson iterative procedure described above using the expression:

$$\theta_{n+1}=\theta_n+\Delta\theta_n$$

and the improved target angle estimate $\theta_{n+1}$ is supplied to the steering vector calculator 532 in order to generate new steering vectors (e.g., $s(\theta_{n+1})$) (510). This process is repeated until the angle of arrival accuracy condition $\Delta\theta_{n,th}$ is met and the estimate of the target angle $\theta_N$ is output by the steering angle calculator 334.

While the present invention has been described in reference to certain exemplary embodiments, it is to be understood to those skilled in the art that the invention is not limited to the disclosed embodiment, but, on the contrary, is intended to cover various modifications included within the spirit and scope of the appended claims and equivalents thereof.

For example, individual hardware components (such as those shown in the embodiments depicted in FIGS. 1, 3B, 4B, and 5B) may be implemented as specialized discrete chips (such as digital signal processors, analog or digital filters, and field programmable gate arrays), general purpose processors programmed to perform the functions of the shown components, or combinations thereof.

What is claimed is:

1. A system for estimating a target direction, the system comprising:
   an electronically steered antenna array configured to receive a wideband signal;
   a processor configured to convolutional or stretch process spatial frequency data of the wideband signal;
   a beam stabilizer configured to:
      stabilize the convolutional or stretch processed spatial frequency data in a stabilization direction;
      compress the convolutional or stretch processed spatial frequency data to a plurality of frequency range or time bins; and
      select range or time bins and form a covariance matrix;
   a steering angle calculator configured to estimate the target direction using the covariance matrix;
   a stabilization angle accuracy threshold calculator configured to determine whether a stabilization direction accuracy condition is met; and
   a stabilization angle updater configured to update the stabilization direction to the estimated target direction,
   wherein the steering angle calculator is configured to initialize the stabilization direction to a beam pointing direction, and
   wherein the steering angle calculator, the stabilization angle accuracy threshold calculator, and the stabilization angle updater are configured to iteratively update the stabilization angle and to recalculate the estimated target direction until the stabilization accuracy condition is met.

2. The system of claim 1, wherein the beam stabilizer is further configured to:
   calculate the convolutional or stretch processed spatial frequency data using processing parameters and antenna direction cosine;
   calculate derivatives of the convolutional or stretch processed spatial frequency data and antenna pattern values using antenna parameters;
   solve for a plurality of stabilization coefficients using normalization constants; and
   apply the plurality of stabilization coefficients to the convolutional or stretch processed spatial frequency data to generate stabilized spatial frequency data.

3. The system of claim 1, wherein the steering angle calculator comprises:
   a steering vector calculator configured to calculate a steering vector using the stabilized spatial frequency data;
   an angle correction calculator configured to calculate an angle of arrival correction using the steering vector; and
   an angle of arrival accuracy calculator configured to compare the angle of arrival correction with an angle of arrival accuracy condition.

4. The system of claim 1, wherein the beam stabilizer comprises:
   a stabilization coefficient calculator configured to calculate a plurality of stabilization coefficients; and
   a combiner configured to combine the spatial frequency data with the plurality of stabilization coefficients to generate stabilized spatial frequency data.

5. The system of claim 1, wherein the steering angle calculator is configured to:
   initialize a steering angle to the stabilization direction;
   calculate a plurality of steering vectors using the steering angle;
   calculate an angle of arrival correction;
   determine if an angle of arrival accuracy condition has been met;
   update the steering angle based on the angle of arrival correction if the angle of arrival accuracy condition has been met;
   iteratively repeat calculating the steering vectors using the steering angle, calculating the angle of arrival correction, determining if the angle of arrival accuracy condition has been met, and updating the steering angle using the steering vectors, and updating the steering angle based on the angle of arrival correction until a steering angle accuracy condition is met; and output the updated steering angle as the estimated target direction when the steering angle accuracy condition is met.

6. The system of claim 1, wherein the target direction comprises a plurality of target directions.

7. The system of claim 1, wherein the beam stabilizer is further configured to compress the convolutional or stretch processed spatial frequency data by applying an inverse Fourier transform to the stabilized spatial frequency data.

8. A system for stabilizing wideband spatial frequency data of a wideband signal for estimating a target direction on an electronically steered antenna array, the system comprising:
   a beam stabilizer configured to stabilize the spatial frequency data in a stabilization direction;
   a steering angle calculator configured to estimate the target direction using the stabilized spatial frequency data;
   a stabilization angle accuracy threshold calculator configured to determine whether a stabilization direction accuracy condition is met; and
   a stabilization angle updater configured to update the stabilization direction to the estimated target direction,
   wherein the steering angle calculator is configured to initialize the stabilization direction to a beam pointing direction and
   wherein the steering angle calculator, the stabilization angle accuracy threshold calculator, and the stabilization angle updater are configured to iteratively update the stabilization angle and to recalculate the estimated target direction until the stabilization accuracy condition is met.

9. The system of claim 8, wherein the steering angle calculator comprises:
   a steering vector calculator configured to calculate a steering vector using the stabilized spatial frequency data;
   an angle correction calculator configured to calculate an angle of arrival correction using the steering vector; and
   an angle of arrival accuracy calculator configured to compare the angle of arrival correction with an angle of arrival accuracy condition.

10. The system of claim 8, wherein the beam stabilizer comprises:
   a stabilization coefficient calculator configured to calculate a plurality of stabilization coefficients; and
   a combiner configured to combine the spatial frequency data with the plurality of stabilization coefficients to generate stabilized spatial frequency data.

11. The system of claim 8, wherein the steering angle calculator is configured to:
   initialize a steering angle to the stabilization direction;
   calculate a plurality of steering vectors using the steering angle;
   calculate an angle of arrival correction;
   determine if an angle of arrival accuracy condition has been met;
   update the steering angle based on the angle of arrival correction if the angle of arrival accuracy condition has been met;
   iteratively repeat calculating the steering vectors using the steering angle, calculating the angle of arrival correction, determining if the angle of arrival accuracy condition has been met, and updating the steering angle using the steering vectors, and updating the steering angle based on the angle of arrival correction until a steering angle accuracy condition is met; and
   output the updated steering angle as the estimated target direction when the steering angle accuracy condition is met.

* * * * *